(12) United States Patent
Irick, Jr. et al.

(10) Patent No.: US 6,492,032 B1
(45) Date of Patent: Dec. 10, 2002

(54) MULTI-COMPONENT OPTICALLY BRIGHTENED POLYOLEFIN BLEND

(75) Inventors: Gether Irick, Jr., Gray, TN (US); Jeffrey Dan Daily, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 161 days.

(21) Appl. No.: 09/689,165

(22) Filed: Oct. 12, 2000

(51) Int. Cl.[7] .................................................. B32B 27/10
(52) U.S. Cl. ...................... 428/509; 428/512; 428/523; 524/84; 524/94; 524/95
(58) Field of Search ............................... 524/94, 95, 84; 428/523, 516, 509, 512

(56) References Cited

U.S. PATENT DOCUMENTS

| | | |
|---|---|---|
| 3,260,715 A | 7/1966 | Saunders |
| 3,366,575 A | 1/1968 | Ono et al. |
| 4,129,412 A | 12/1978 | Günther et al. |
| 4,169,810 A | 10/1979 | Günther et al. |
| 4,282,355 A | 8/1981 | Erckel et al. |
| 4,330,427 A | 5/1982 | Martini et al. |
| 4,363,744 A | 12/1982 | Günther et al. |
| 4,416,795 A | 11/1983 | Martini et al. |
| 4,447,350 A | 5/1984 | Martini et al. |
| 4,508,784 A | 4/1985 | Gugliemetti |
| 4,666,627 A | 5/1987 | Meyer |
| 4,794,071 A | 12/1988 | Tomko et al. |
| 4,859,539 A | 8/1989 | Tomko et al. |
| 5,106,989 A | 4/1992 | Kubbota et al. |
| 5,173,397 A | 12/1992 | Noda et al. |
| 5,817,448 A | 10/1998 | Hayashi et al. |
| 6,177,574 B1 * | 1/2001 | Chamberlin ................. 548/219 |
| 6,312,822 B1 * | 11/2001 | Irick et al. ............... 428/479.6 |

FOREIGN PATENT DOCUMENTS

| | | |
|---|---|---|
| DE | 15 94 855 A | 5/1971 |
| DE | 33 13 332 A | 10/1984 |
| DE | 38 18 986 A | 12/1988 |
| EP | 0 791 680 A2 | 8/1997 |

OTHER PUBLICATIONS

Database WPI, Section Ch, Week 198931, *Derwent Publications Ltd.*, London GB, Class E13, AN 1989–223764 XP002184230 (JP 01 159655 A, Jun. 22, 1989, Fuji Photo Film Co., Ltd).

Patent Abstracts of Japan, vol. 18, No. 630 (P–1835), Nov. 30, 1994 (JP 06 242549 A, Sep. 2, 1994, Mitsubishi Paper Mills, Ltd.).

* cited by examiner

*Primary Examiner*—D. Lawrence Tarazano
(74) *Attorney, Agent, or Firm*—Betty J. Boshears; Bernard J. Graves, Jr.

(57) ABSTRACT

A blend of optical brighteners includes (a) from about 45 to 95 weight % of a mixture of benzoxazolyl stilbenes; and (b) from about 55 to about 5 weight % of at least one bis(benzoxazolyl)naphthalene based brightener, bis(benzoxazolyl)thiophene based brightener, a pyrazoline based brightener, a coumarin based brightener, and mixtures thereof, wherein the weight percents of the optical brightener blend are based on the total weight of optical brighteners in the blend. The optical brightener blend is useful for admixing with a polyolefin resin which in turn may be used for photo imaging applications.

15 Claims, No Drawings

MULTI-COMPONENT OPTICALLY BRIGHTENED POLYOLEFIN BLEND

BACKGROUND OF THE INVENTION

1. Field of the Invention

The present invention relates to a mixture of optical brighteners that are useful for brightening polyolefin films. Another aspect of the present invention is for compositions having the mixture of particular optical brighteners included therewith, and particularly to polyolefins having a blend of three (3) optical brighteners wherein two of the optical brighteners are bis-benzoxazolyl stilbenes and the third optical brightener is selected from at least one bis(benzoxazolyl)naphthalene based brightener, bis(benzoxazolyl)thiophene based brightener, a coumarin based brightener and a pyrazoline based brightener. The polyolefin-brightener blend is particularly useful as a resin coating for a photographic support.

2. Background of the Invention

Polyolefins are widely used in extrusion and molding applications, and in the making of films for varied applications. For example, polyethylene compositions are used in cast or tubular blown films, thin films, extrusion coated paper, paperboard, photographic paper, digital and thermal imaging papers, diaper backing, plastic substrates, injection or compression molded objects, packaging applications (such as coatings on soap boxes, milk cartons, fruit juice cartons, etc.), and the like. In these applications, the polymer is generally processed at high temperatures.

The present invention has particular utility in the field of extruded films for imaging and photographic support applications, such as, extrusion coated paper, paperboard, photographic paper, digital paper and thermal imaging papers. With respect to a photographic support, generally a paper base material is coated with a thin polyolefin film. The polyolefin coating provides a very smooth surface when thin layers of a silver halide emulsion, are desired to be coated on the photographic paper.

To improve image quality, the polyolefin coating usually includes an optical brightener, such as a fluorescent whitening agent, to make the white areas of the support even brighter. Typical optical brighteners fluoresce upon irradiation with ultraviolet light emitting visible light, typically bluish in hue, replacing the light that would have been lost and thereby enhancing the brightness of the support. Optical brighteners for use in such fields as photographic printing materials must absorb ultraviolet light, especially in the region from 280 to 405 nanometers (nm), and re-emit such light so as to enhance the brightness of the print. Desirably, the optical brightener has stability to temperatures as high as 310° C. to 330° C., so that it may be incorporated into the polyolefin during an extrusion process or film forming process and in extruding the polyolefin onto the paper based material.

It is desirable that the optical brightener be non-migrating so that it remains in the polyolefin coating and does not exude as a surface film on the polyolefin. Such exudation not only gives rise to a non-uniform brightness of the reflection surface, but also readily transfers to any other surface coming in contact with it. For example, a brightener transferred to the back side of the adjacent support layer when wound in roll can adversely affect subsequent coating and finishing operations of the photograph. This can result in the final product having a poor quality and performance.

It is recognized in the art that the addition of optical brighteners to polyolefins has been less than satisfactory. For example, U.S. Pat. No. 3,449,257 describes 2,5-bis(benzoxazolyl)thiophenes, such as Uvitex OB® available from Ciba Specialty Chemicals, as non-migrating brighteners for hydrophobic polymers, but were found to undergo bleeding and yellowing from a polyolefin film in U.S. Pat. No. 5,173,397.

In an effort to improve the compatibility between hydrophobic or non-polar polyolefins and optical brighteners, U.S. Pat. Nos. 4,794,071 and 4,859,539 issued to Tomko, et al. on Dec. 27, 1988, and Aug. 22, 1989, respectively, disclose a mixture of optical brighteners that when incorporated into a pigmented polyolefin layer of a photographic support minimizes exudation of the brightener at the polyolefin surface. The mixture of optical brighteners includes three specific fluorescent bis(benzoxazolyl)stilbenes. U.S. Pat. No. 4,794,071 teaches that single component optical brighteners of the mixture exhibit severe exudation when compared to the optical brightener mixture described in U.S. Pat. No. 4,794,071.

U.S. Pat. No. 5,817,448 issued to Hayashi et al. on Oct. 6, 1998 discloses a silver halide photographic material having a support material with at least one light-sensitive silver halide emulsion layer provided thereon. The support material includes a resin coated paper having a titanium dioxide pigment coated with a silane coupling agent, and at least one brightening agent selected from a bis-(benzoxazolyl)naphthalene based brightening agent, a bis-(benzoxazolyl)thiophene based brightening agent, a coumarin based brightening agent and a pyrazoline based brightening agent.

The patent further discloses a silver halide photographic material having a support material with three kinds of light-sensitive silver halide emulsion layers, with each layer having different light-sensitive wavelength regions. The support material includes a resin coated paper having a titanium dioxide pigment coated with a silane coupling agent, and at least one bis-(benzoxazolyl)stilbene based brightening agent. However, the patent is silent as to using a combination of at least three optical brighteners where two are bis-(benzoxazolyl)stilbene based brightening agents and the third brightening agent is selected from a bis-(benzoxazolyl)naphthalene based brightening agent, a bis-(benzoxazolyl)thiophene based brightening agent, a coumarin based brightening agent and a pyrazoline based brightening agent.

U.S. Pat. No. 4,416,795 discloses a mixture of optical brighteners having from 1 to 99 weight % of a bis-benzoxazolylstyrene and from 99 to 1 weight % of one or more secondary compounds.

U.S. Pat. No. 5,106,989 discloses a photographic support having a polyolefin resin coating wherein the resin includes a titanium dioxide pigment and an alkyl-substituted 2,2-(1,4-naphthalenediyl)dibenzoxazole optical brightener.

U.S. Pat. No. 4,363,744 discloses a mixture of optical brighteners wherein a bis-benzoxazolyl or bis-benzothiazolyl-stilbene is mixed with a second mixture of optical brighteners having formulae I and II disclosed therein.

U.S. Pat. No. 4,169,810 discloses a mixture of optical brighteners having from 0.05 to 0.95 part by weight of a benzoxazolyl- or a benzothiazolyl-stilbene compound and from 0.95 to 0.05 part by weight of a bis-benzoxazolyl- or bis-benzothiazolyl-stilbene compound or a benzoxazolyl- or benzothiazolyl-stilbene oxazolo[5,4-6]pyridinyl or oxazolo[2,3-b]pyridinyl compound.

U.S. Pat. No. 4,129,412 discloses a mixture of optical brighteners having 0.05 to 1% of a 4-benzoxazolystilbene derivative and 1 to 0.05% of a 1,1-bis-benxoxazolyl or bis-benxthiazolyl-naphthalene derivative that are useful for brightening textile material of linear polyesters, polyamides and acetyl cellulose.

Accordingly, there is a need for the incorporation of an optical brightener into a non-polar polyolefin that will exhibit the good compatibility with the polyolefin and not exude as a surface film on the polyolefin.

SUMMARY OF THE INVENTION

Broadly, the present invention is a mixture of optical brighteners that show an enhanced degree of whiteness when admixed with a polyolefin and particularly when admixed with polyethylene to make a film, as compared to the same amount of the constituents in the polyolefin as single components. The optical brightener mixture of the present invention includes (a) of from about 45 to 95 weight % of a mixture of benzoxazolyl stilbenes and (b) of from about 55 to about 5 weight % of at least one bis (benzoxazolyl)naphthalene based brightener, bis (benzoxazolyl)thiophene based brightener, a coumarin based brightener and a pyrazoline based brightener, wherein the weight percents are based on the total weight of optical brighteners in the mixture.

Another aspect of the present invention is for an optically brightened polyolefin resin having admixed therein from about 0.001 to 0.1 weight % of the optical brightener mixture described above.

Yet another aspect of the present invention is for a photoimaging material having a photoimaging support material comprised of a paper based material having a pigment comprised of titanium dioxide that is substantially free of siloxanes and a mixture of optical brighteners in accordance with this invention.

It is an object of the present invention to provide an optical brightener mixture for a polyolefin resin that is characterized by excellent absorption and emission attributes and has the necessary heat stability to meet the requirements for use in a photoimaging resin coating.

Another object of the present invention is for an optical brightener mixture having a low exudation rate from a polyolefin film, wherein the exudation is determined by the b* CIE value.

Yet another object of the present invention is to provide a photoimaging support material having a titanium dioxide pigment and an optically brightened, polyolefin resin coating on at least one surface of the support material.

These and other objects and advantages of the present invention will become more apparent to those skilled in the art to which this invention pertains upon reference to the following detailed description of the preferred embodiments.

DETAILED DESCRIPTION OF THE PREFERRED EMBODIMENTS

The various aspects of the present invention are particularly described with regard to the preferred embodiments as a blend of optical brighteners that are useful in blending with a polyolefin resin. The optically brightened polyolefin resin is further useful in a photo imaging material having a support material coated on at least one surface with the optically brightened polyolefin. In addition, the blend of optical brighteners and resin incorporating the same are useful in applications where an optically brightened polyolefin coating resistant to brightener exudation is desired.

With regard to the compositional blend of optical brighteners, the blend includes a at least three optical brighteners wherein two are a mixture of benzoxazolyl stilbenes and one is an optical brightener other than a benzoxazolyl stilbene. Specifically, the optical brightener blend includes (a) from about 45 to 95 weight % of a mixture of benzoxazolyl stilbenes; and (b) from about 55 to about 5 weight % of at least one bis(benzoxazolyl)naphthalene based brightener, bis(benzoxazolyl)thiophene based brightener, a pyrazoline based brightener, or a coumarin based brightener, and mixtures thereof wherein the weight percents are based on the total weight of optical brighteners in the blend. Preferably, the optical brightener blend includes from about 55 to 70 weight % of mixture (a) and from about 45 to 30 weight % of constituent (b).

The mixture, (a), of benzoxazolyl stilbenes has as a first component (i), from about 10 to about 90 parts by weight of a 4,4'-bis(benzoxazol-2-yl)stilbene and, as a second component (ii), from about 90 to about 10 parts by weight of mono and/or di substituted benzoxazolyl stilbenes represented by the formula:

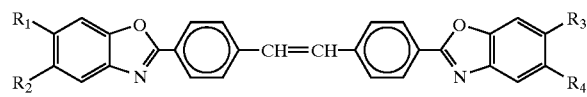

wherein $R_1$–$R_4$ are independently selected from hydrogen, an alkyl group having 1 to 15 carbon atoms, an alkoxyl group having 1 to 15 carbon atoms, an aryl group having from 6 to 15 carbon atoms and mixtures thereof. Preferably, $R_1$–$R_4$ are independently selected from hydrogen, a methyl group, an ethyl group, a tert-butyl group, a tert-octyl group and mixtures thereof. In a particularly preferred embodiment, the mixture (a) of benzoxazolyl stilbenes includes from about 25 to about 50 parts by weight of 4,4'-bis(benzoxazol-2-yl)stilbene and (ii) from about 75 to about 50 parts by weight of a second component selected from 4-(benzoxazol-2-yl)-4'-(5-methylbenzoxazol-2-yl) stilbene, and 4,4'-bis(5-methylbenzoxazol-2-yl)stilbene. Preparation of the mono and di benzoxazolyl stilbenes is described in greater detail in U.S. Pat. Nos. 3,260,715 and 4,282,355, the entire disclosures of which are incorporated herein by reference.

The bis(benzoxazolyl)naphthalene based brightening agent is preferably represented by the formula:

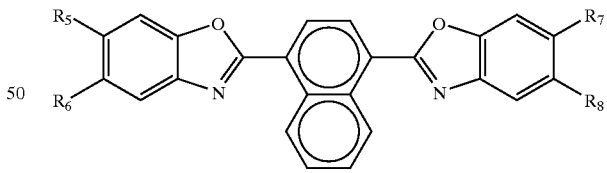

wherein $R_5$–$R_8$ are independently selected from hydrogen, an alkyl group having 1 to 15 carbon atoms, an alkoxyl group having 1 to 15 carbon atoms, an aryl group having from 6 to 15 carbon atoms and mixtures thereof. Preferably, $R_5$–$R_8$ are independently selected from hydrogen, a methyl group, an ethyl group, a tert-butyl group, a tert-octyl group and mixtures thereof. More preferably, the bis (benzoxazolyl)naphthalene based brightening agent is selected from 1,4-bis(benzoxazol-2-yl)naphthalene; 1,4-bis (5-tert-butylbenzoxazol-2-yl)naphthalene; 1,4-bis(5-tert-octylbenzoxazol-2-yl)naphthalene and mixtures thereof.

The bis(benzoxazolyl)thiophene based brightening agent is preferably represented by the formula:

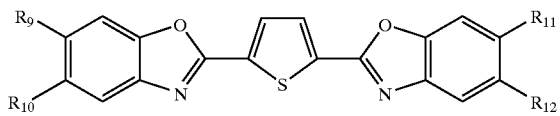

wherein $R_9$–$R_{12}$ are independently selected from hydrogen, an alkyl group having 1 to 15 carbon atoms, an alkoxyl group having 1 to 15 carbon atoms, an aryl group having from 6 to 15 carbon atoms, and mixtures thereof. Preferably, $R_9$–$R_{12}$ are independently selected from hydrogen, a methyl group, an ethyl group, a tert-butyl group, a tert-octyl group, and mixtures thereof. More preferably, the bis (benzoxazolyl)thiophene based brightening agent is selected from 2,5-bis(benzoxazol-2-yl)thiophene; 2,5-bis(5-tert-butylbenzoxazol-2-yl)thiophene; 2,5-bis(5-tert-octylbenzoxazol-2-yl)thiophene and mixtures thereof.

The pyrazoline based brightening agent is preferably represented by the formula:

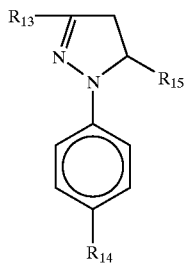

wherein $R_{13}$–$R_{15}$ are independently selected from hydrogen, an alkyl group having 1 to 15 carbon atoms, an alkoxyl group having 1 to 15 carbon atoms, an aryl group having from 6 to 15 carbon atoms, a sulfonamido group, and mixtures thereof. Preferably, $R_{13}$–$R_{15}$ are independently selected from hydrogen, a methyl group, an ethyl group, a tert-butyl group, a tert-octyl group, and mixtures thereof. More preferably, the pyrazoline based brightening agent is 1-(4-tert-octylphenyl)-3-phenylpyrazoline.

The coumarin based brightening agent is preferably represented by the formula:

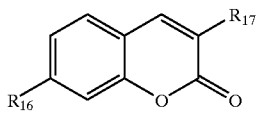

wherein $R_{16}$ is selected from an organic group containing a triazine and triazole ring, $R_{17}$ is selected from hydrogen, an alkyl group having 1 to 15 carbon atoms, an alkoxyl group having 1 to 15 carbon atoms, an aryl group having from 6 to 15 carbon atoms, and mixtures thereof. More preferably, the coumarin based brightening agent is selected from 3-phenyl-7-(2,3-naphthotriazol-2-yl)coumarin; 3-phenyl-7-(1,2-naphthotriazol-2-yl)coumarin; 3-phenyl-7-(benzotriazol-2-yl)coumarin and mixtures thereof.

In a particularly preferred embodiment, the blend of optical brighteners includes (a) from about 45 to 95 weight % of a mixture having (i) from about 25 to about 50 parts by weight of 4,4'-bis(benzoxazol-2-yl)stilbene and (ii) from about 75 to about 50 parts by weight of a second component (ii) selected from 4-(benzoxazol-2-yl)-4'-(5-methylbenzoxazol-2-yl)stilbene, and 4,4'-bis(5-methylbenzoxazol-2-yl)stilbene and (b) from about 55 to about 5 weight % of another, non-bis(benzoxaxolyl)stilbene selected from 2,5-bis(5-t-butylbenzoxazol-2-yl)thiophene, or coumarin brightener (Leucopure EGM).

The aforementioned bis(benzoxazolyl)naphthalene based brightener, bis(benzoxazolyl)thiophene based brightener, a pyrazoline based brightener, a coumarin based brightener are discussed in greater detail in U.S. Pat. No. 5,817,448, the entire disclosure of which is incorporated herein by reference.

In another aspect of the present invention, the optical brightener blend described above can be incorporated into a polyolefin. The amount of brightener blend used in the polyolefin is an effective amount to brighten the reflective layer or coating. Such amounts in the polyolefin can be from about 0.001 to about 0.1 weight % based on the total weight of the polyolefin coating. However, for photoimaging, the amount of the optical brightener blend admixed with the polyolefin is desirably from 0.005 to 0.08 weight %. Excellent brightening with no or minimal exudation has resulted when 0.01 to 0.06 weight % of the blend of optical brightening agents has been incorporated into the polyolefin.

Polyolefinic resins suitable for use with the optical brightener blend and in accordance with the present invention include any coatable polyolefin material known in the photographic art. Representative of these materials are polyethylene, and particularly useful are LDPE, HDPE, and LLDPE, polypropylene, polystyrene, polybutylene, polyolefin copolymers, and mixtures containing one or more homopolymers and/or copolymers thereof. Polyethylenes useful in this invention will generally have densities in a range of about 0.900 g/cc to about 0.980 g/cc, and preferably from 0.910 to 0.965 g/cc, although lower and higher density polyethylenes may be used. Useful materials will preferably also have melt index values of about 0.7 to about 50 g/10 min. The polyolefin composition can also be a mixture of polyolefins, such as a mixture of two or more polyethylenes having different melt indexes. The polyethylenes can contain, and generally will contain, other materials used as processing aids, or materials used to make the finished product more useful in it's end-use.

The polyolefin can be copolymerized with one or more comonomers such as vinyl stearate, vinyl acetate, acrylic acid, methyl acrylate, ethyl acrylate, butyl acrylate, acrylamide, methacrylic acid, methyl methacrylate, ethyl methacrylate, methacrylamide, butadiene, and isoprene. Preferred polyolefins are film forming and cohere to paper.

The optical brightener mixture can be incorporated into the polyolefin by conventional methods. Preferred are methods whereby the brightener is uniformly dispersed within the polyolefin. Such methods include a melt extrusion process, a kneading extruder, a roll mill, a high shear mixer, or a twin-screw compounder. Optionally, the brighteners may be added to the polyolefin in the form of powder blend to make a single concentrate in a suitable polymeric resin, or as individual concentrates of the individual brighteners in the polymeric resin.

In accordance with another aspect of the present invention, a photoimaging material is provided having a silver halide emulsion layer coated on a photoimaging support material, a pigment, and coated on at least one surface of the support material, the optically brightened polyolefin resin described above. Desirably the photoimaging support material is a cellulosic material such as a paper base material, or a modified cellulose material selected from cellulose materials that are useful for modification by chemical derivatization on or regeneration and includes, but is not limited to, cellulose esters, cellulose ethers, nitrocellulose, viscose cellulose, microcrystalline cellulose, and microfibrillated cellulose with paper being preferred. The paper base material can also be prepared from a blend of wood cellulose and a suitable synthetic fiber such as a blend of wood cellulose and polyethylene fiber.

The paper base material employed in accordance with the present invention can be any paper base material which has heretofore been considered useful as a photographic support. The weight and thickness of the support can be varied depending on the intended use. A preferred weight range is from about 20 g/m² to about 500 g/m². Preferred thickness (those corresponding to commercial grade photographic paper) ranges from about 20 microns to about 500 microns. It is preferred to use a paper base material having a smooth surface. The paper base material can be made from any suitable paper stock preferably comprising hard or softwood. Either bleached or unbleached pulp can be utilized as desired.

The paper base material may further contain, if desired, agents to increase the strength of the paper such as wet strength resins, e.g., the amino-aldehyde or polyamide-epichlorohydrin resins, and dry strength agents, e.g., starches, including both ordinary starch and cationic starch, or polyacrylamide resins. Other additives include water soluble gums, e.g., cellulose ethers such as carboxymethyl cellulose, sizing agents, e.g., a ketene dimer, sodium stearate which is precipitated onto the pulp fibers with a polyvalent metal salt such as alum, aluminum chloride or aluminum sulfate; fluorescing agents; antistatic agents; fillers, including clays or pigments such as titanium dioxide; dyes; and the like.

A white pigment can be added to the polyolefin resin layer with the optical brightener mixture. The white pigment can be can be titanium dioxide, zinc oxide, zinc sulfide, zirconium dioxide, white lead, lead sulfate, lead chloride, lead aluminate, lead phthalate, antimony trioxide, white bismuth, tin oxide, white manganese, white tungsten and combinations thereof. The pigment is used in any form that is conveniently dispersed within the polyolefin. The preferred pigment is titanium dioxide that is substantially free of silane coupling agents. As used herein, "substantially free" means less than 0.01 weight % and preferably less than 0.001 weight % of a silane coupling agent. The titanium dioxide can be anatase, rutile or combinations of these forms. The titanium dioxide may further contain oxides of silicon or aluminum, or mixtures thereof, as surface coatings or present inside the titanium dioxide particle as described in U.S. Pat. Nos. 5,075,206 and 5,173,397, the entire disclosures of which are incorporated herein by reference. Other elements such as zinc, calcium and magnesium may also be present in or on the titanium dioxides as a result of their use by the pigment manufacturers to tailor the performance of the pigments for specific end-use applications. Enhanced image resolution in a photographic element can be obtained by the addition of functional amounts of such highly whitelight reflective pigments to the polyolefin layer. Preferably, the white pigment is used in the range from about 3 to 35%, more preferably 5 to 25% by weight based on the total weight of the polyolefin coating. Titanium dioxide at levels of 5 to 20% is particularly useful.

In addition to the blend of optical brighteners and the white pigment, the polyolefin coating can contain, if desired, a variety of additives including stabilizers and antioxidants such as 4,4'-butylidene-bis(6-tert-butyl-meta-cresol), di-lauryl-3,3'-thiodipropionate, bis(2,2,6,6-tetramethyl-4-piperidinyl)sebacate (TINUVIN 770, available from Ciba Specialty Chemicals), 1,3,5-triazine-2,4,6-triamine, N,N'''-[1,2-ethanediylbis[[[4,6-bis[butyl(1,2,2,6,6-pentamethyl-4-piperidinyl)amino]-1,3,5-triazine-2-yl]imino]-3,1-propanediyl]]-bis[N',N''-dibutyl-N',N''-bis(1,2,2,6,6-pentamethyl-4-piperidinyl)-(CHIMASSORB 119, available from Ciba Specialty Chemicals), 2,2-bis[[3-[3,5-bis(1,1-Dimethylethyl)-4-hydroxyphenyl]-1-oxopropoxy]methyl]-1,3-propanediyl 3,5-bis(1,1-dimethylethyl)-4-hydroxybenzenepropanoate (IRGANOX 1010, available from Ciba Specialty Chemicals), octadecyl 3-(3',5'-di-tert-butyl-4'-hydroxyphenyl)propanoate (IRGANOX 1076, available from Ciba Specialty Chemicals), tris(2,4-di-tert-butylphenyl)phosphite (IRGAFOS 168, available from Ciba Specialty Chemicals), and combinations of the above; slip agents, such as higher aliphatic acid metal salts such as magnesium stearate, calcium stearate, zinc stearate, aluminum stearate, sodium stearate, calcium palmitate, sodium palmitate, zirconium octylate, sodium laurate, and mixtures thereof; additional optical brighteners; antistatic agents; dispersing agents; coating aids; lubricants; dyes; and the like, as are well known to those skilled in the art.

The coating of the paper base material with the polyolefin preferably is by extrusion from a hot melt, as is known in the art. The surface of the paper base material desirably is treated with corona discharge to obtain a good adhesion between the polyolefin and the paper before the polyolefin coating is extruded onto the treated surface. The invention can be practiced within a wide range of extrusion temperatures, for example, 150°–350° C. For many applications, preferred extrusion temperatures are from about 310°–330° C. As noted, it is an advantageous feature of this invention that the mixture of optical brighteners is stable to such temperatures. Generally, the optically brightened polyolefin coating, over which the silver halide emulsion is applied, is coated onto the paper base material in a coverage of about 1 to 100 g/m², at a uniform thickness ranging from about 1 to 100 microns. About the same coverage of clear polyethylene coating preferably is applied to the side of the paper base material opposite to the pigmented polyolefin coating. As such, the polyolefin coatings are particularly effective in preventing acid and alkaline photographic processing solutions from penetrating to the paper base.

The photographic elements in accordance with this invention comprise the above-described optically brightened photographic support and at least one silver halide emulsion layer. Any of the known silver halide emulsion layers are useful in preparing photographic elements in accordance with this invention. Generally, the photographic element is prepared by coating the support with one or more layers having a dispersion of silver halide crystals in an aqueous solution of gelatin. The coating process is generally carried out on a continuously operating machine with a single layer or a plurality of layers are applied to the support.

The present invention is illustrated in greater detail by the specific examples presented below. It is to be understood that these examples are illustrative embodiments and are not intended to be limiting of the invention, but rather are to be construed broadly within the scope and content of the appended claims.

In the Examples below, the following optical brighteners were used:

4,4'-bis(Benzoxazol-2-yl)stilbene (C)

4-(Benzoxazol-2-yl)-4'-(5-methylbenzoxazol-2-yl) stilbene (D)

4,4'-bis(5-Methylbenzoxazol-2-yl)stilbene (E)

2,5-bis(5-t-Butylbenzoxazol-2-yl)thiophene (F)

3-Phenyl-7-(1,2-naphthotriazol-2-yl)coumarin (Leucopure EGM) (G).

Color measurements (Commission International d'Eclairage L*a*b* values in a Spectroflash 600 unit using D65 illuminant with ultraviolet included, and 10 degree observer) were made on the films prepared as specified below. The films were then aged in a Blue M convection oven at 60° C. for up to 88 hours, and at room temperature for up to 24 weeks. The color measurements were thereafter retaken. The change in b* value was taken as a measure of the rate of exudation of the optical brightener from the film, with the greater the change in b* the greater the amount of optical brightener exuding from the surface. The larger the numerical value of −b*, the greater the brightening efficiency. Decreases in the numerical value of −b* during aging indicate a loss of brightening efficiency and an increase in yellowness. Positive values for b* indicate a yellowed resin, and the greater the numerical value for b*, the more yellow the resin will appear.

COMPARATIVE EXAMPLES 1–13

A dry-blended mixture of 6.665 pounds (3023.2 grams) of low-density polyethylene, 3.33 pounds (1513.6 grams) of a concentrate containing 33.3 weight % of an anatase titanium dioxide in low-density polyethylene, and the specified amount of optical brightener(s) was added to give the desired brightener concentration. This mixture was melt-blended at 360° F. in a single-screw extruder. The extrudate was pelletized and was then extruded at 360° F. into 3-mil (75 micron) thick film. Color measurements were taken after the specified time interval and in accordance with the method described above. The results of the yellowness measurements appear in Table I below.

COMPARATIVE EXAMPLES 14 AND 15

The specified amount of optical brightener mixture was admixed with the dry-blended mixture of low-density polyethylene, anatase or rutile titanium dioxide of Comparative Examples 1–13. This mixture was melt-blended at 400–450° F. in a single-screw extruder. The extrudate was pelletized and was then extruded at 600° F. into 3-mil (75 micron) thick film. Color measurements were taken after the specified time interval and in accordance with the method described above. The results of the yellowness mesurements appear in Table II below.

EXAMPLES 16 AND 17

In accordance with the present invention, the specified amount of optical brightener mixture was admixed with the dry-blended mixture of low-density polyethylene, anatase or rutile titanium dioxide of Comparative Examples 1–13. This mixture was melt-blended at 400–450° F. in a single-screw extruder. The extrudate was pelletized and was then extruded at 600° F. into 3-mil (75 micron) thick film. Color measurements were taken after the specified time interval and in accordance with the method described above. The results of the yellowness measurements appear in Table III below.

TABLE 1

| | Weight Percentages of Brighteners | | | | | | b*, 60C Ageing for Hours Indicated | | | b*, 20–22C Ageing for Wks Indicated | | |
|---|---|---|---|---|---|---|---|---|---|---|---|---|
| Example | C | D | E | F | G | TiO2 | 0 | 44 | 88 | 0 | 8 | 24 |
| 1 | 0.025 | | | | | Anatase | −7.45 | −0.49 | −0.61 | −7.60 | −4.79 | −1.48 |
| 2 | 0.05 | | | | | Anatase | −8.30 | 4.22 | 4.44 | −8.29 | −0.58 | −0.88 |
| 3 | | 0.05 | | | | Anatase | −8.32 | −3.94 | −3.40 | −8.34 | −5.83 | −3.79 |
| 4 | | | 0.05 | | | Anatase | −8.47 | −3.03 | 1.39 | −8.44 | −7.18 | −1.36 |
| 5 | | | | 0.025 | | Anatase | — | — | — | −4.64 | −4.82 | −4.96 |
| 6 | | | | 0.05 | | Anatase | — | — | — | −6.33 | −6.63 | −6.82 |
| 7 | | | | 0.125 | | Anatase | −9.32 | −8.75 | −9.16 | −9.55 | −9.06 | −7.60 |
| 8 | | | | | 0.05 | Anatase | −7.00 | 0.36 | 0.72 | −6.89 | −0.23 | −0.20 |
| 9 | 0.0025 | | 0.0225 | | | Anatase | −8.31 | −5.81 | −4.05 | −8.33 | −7.59 | −4.16 |
| 10 | 0.005 | | 0.0045 | | | Anatase | −11.58 | 5.55 | — | −11.51 | −3.29 | −3.80 |
| 11 | 0.0275 | | 0.0225 | | | Anatase | −10.75 | −1.47 | — | −10.71 | −6.44 | −1.05 |
| 12 | 0.013 | | | 0.013 | | Anatase | −6.34 | −4.66 | −4.02 | −6.30 | −5.66 | −4.39 |
| 13 | 0.0143 | | 0.0117 | | | Anatase | −7.06 | −5.61 | −4.83 | −7.09 | −6.61 | −4.71 |

TABLE II

| | Weight Percentages of Brighteners | | | | | | b*, 60C Ageing for Hours Indicated | | | b*, 20–22C Ageing for Wks Indicated | | |
|---|---|---|---|---|---|---|---|---|---|---|---|---|
| Example | C | D | E | F | G | TiO2 | 0 | 44 | 88 | 0 | 8 | 24 |
| 14 | 0.025 | 0.025 | | | | Anatase | −8.89 | −7.40 | −6.70 | −8.86 | −8.86 | −8.02 |
| 15 | 0.025 | 0.025 | | | | Rutile | −3.60 | −3.50 | −3.22 | −2.98 | −3.01 | −2.74 |

TABLE III

| | Weight Percentages of Brighteners | | | | | | b*, 60C Ageing for Hours Indicated | | | b*, 20–22C Ageing for Wks Indicated | | |
|---|---|---|---|---|---|---|---|---|---|---|---|---|
| Example | C | D | E | F | G | TiO2 | 0 | 44 | 88 | 0 | 8 | 24 |
| 16 | 0.015 | | 0.0225 | 0.025 | | Anatase | −9.09 | −9.06 | −9.40 | −8.83 | −8.65 | −8.28 |
| 17 | 0.015 | | 0.0225 | 0.025 | | Rutile | −3.99 | −3.97 | −4.14 | −3.85 | −4.06 | −4.00 |

As can be seen from Table I, Comparative Examples 1–4, a single benzoxazolylstilbene brightener exudes badly upon ageing. Comparative examples 5–7 show that a benzoxazolylthiophene brightener alone does not exude upon ageing, but that it requires much higher concentrations to achieve the same brightening efficiency provided by individual benzoxazolylstilbene brighteners, or by blends containing benzoxazolylstilbene brighteners. Comparative Example 8 shows that a coumarin brightener alone exudes badly upon ageing. Comparative examples 9, 10, 11, 13, 14 and 15 show that combinations of two benzoxazolylstilbene brighteners also exude upon ageing. Comparative example 12 shows that a combination of one benzoxazolylstilbene brightener with a benzoxazolylthiophene brightener also exudes upon ageing.

In accordance with the present invention, as can be seen from Examples 16 and 17, combinations of two benzoxazolylstilbene brighteners with a non-benzoxazolylstilbene brightener show high initial brightening efficiency and no loss of brightening efficiency upon ageing at either room temperature, or at 60° C.

Having described the invention in detail, those skilled in the art will appreciate that modifications may be made to the various aspects of the invention without departing from the scope and spirit of the invention disclosed and described herein. It is, therefore, not intended that the scope of the invention be limited to the specific embodiments illustrated and described but rather it is intended that the scope of the present invention be determined by the appended claims and their equivalents.

We claim:

1. An optically brightened polyolefin resin comprising a polyolefin and an effective amount of optical brightener blend admixed therein wherein said optical brightener mixture comprises (a) from about 45 to 95 weight % of a mixture of benzoxazolyl stilbenes comprising (i) from about 25 to about 50 parts by weight of a first component selected from 4,4'-bis(benzoxazol-2-yl)stilbene and (ii) from about 75 to about 50 parts by weight of a second component selected from the group consisting of mono and di substituted benzoxazolyl stilbenes represented by the formula

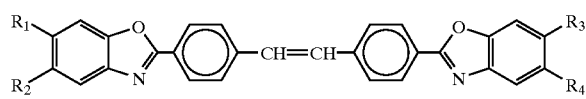

wherein $R_1$–$R_4$ are independently selected from the group consisting of hydrogen, an alkyl group having 1 to 15 carbon atoms, an alkoxyl group having 1 to 15 carbon atoms, an aryl group having from 6 to 15 carbon atoms and mixtures thereof; and (b) from about 55 to about 5 weight % of at least one bis(benzoxazolyl)naphthalene based brightener, bis(benzoxazolyl)thiophene based brightener, a pyrazoline based brightener, a coumarin based brightener, and mixtures thereof wherein said weight percents of (a) and (b) are based on the total weight of optical brighteners in said mixture.

2. The optically brightened polyolefin resin of claim 1 wherein said polyolefin is selected from the group consisting of polyethylene, polypropylene, polybutylene, copolymers of said polyolefins and mixtures thereof.

3. The optically brightened polyolefin of claim 2 wherein said polyolefin is polyethylene and copolymers thereof having from about 0.001 to 0.1 weight % of said optical brightener blend admixed therein, wherein said (ii) second component is selected from the group consisting of 4-(benzoxazol-2-yl)-4'-(5-methylbenzoxazol-2-yl)stilbene, and 4,4'-bis(5-methylbenzoxazol-2-yl)stilbene and said (b) is selected from the group consisting of 2,5-bis(5-t-butylbenzoxazol-2-yl)thiophene, 3-phenyl-7-(2,3-naphthotriazol-2-yl)coumarin, 3-phenyl-7-(1,2-naphthotriazol-2-yl)coumarin, 3-phenyl-7-(benzotriazol-2-yl)coumarin and mixtures thereof.

4. The optically brightened polyolefin resin of claim 1 wherein (b) is a pyrazoline based brightener having the formula:

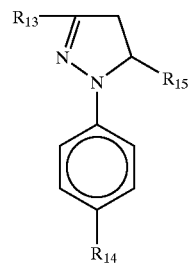

wherein $R_{13}$–$R_{15}$ is are independently selected from the group consisting of hydrogen, an alkyl group having 1 to 15 carbon atoms, an alkoxyl group having 1 to 15 carbon atoms, an aryl group having from 6 to 15 carbon atoms, a sulfonamido group and mixtures thereof.

5. The optically brightened polyolefin resin of claim 4 wherein $R_{13}$–$R_{15}$ are independently selected from the group consisting of hydrogen, a methyl group, an ethyl group, a tert-butyl group, a tert-octyl group and mixtures thereof.

6. A photoimaging material comprising a photoimaging support, a titanium dioxide pigment that is substantially free of silane coupling agents adjacent to said photoimaging support, and an optically brightened polyethylene resin having from 0.001 to 1.0 weight % of optical brightener blend admixed with said polyethylene, wherein said optical brightener mixture comprises (a) from about 45 to 95 weight % of a mixture of benzoxazolyl stilbenes comprising (i) from about 25 to about 50 parts by weight of a first component selected from 4,4'-bis(benzoxazol-2-yl)stilbene and (ii) from about 75 to about 50 parts by weight of a second component selected from the group consisting of mono and di substituted benzoxazolyl stilbenes represented by the formula

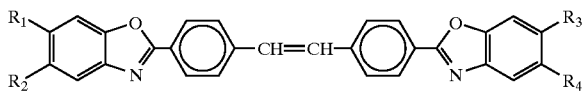

wherein $R_1$–$R_4$ are independently selected from the group consisting of hydrogen, an alkyl group having 1 to 15 carbon atoms, an alkoxyl group having 1 to 15 carbon atoms, an aryl group having from 6 to 15 carbon atoms and mixtures thereof; and (b) from about 55 to about 5 weight % of at least one bis(benzoxazolyl)naphthalene based brightener, bis(benzoxazolyl)thiophene based brightener, a pyrazoline based brightener, a coumarin based brightener, and mixtures thereof wherein said weight percents of (a) and (b) are based on the total weight of optical brighteners in said mixture.

7. The photoimaging material of claim 6 wherein said photoimaging support material is a cellulose containing material selected from the group consisting of paper, and modified cellulose materials selected from the group consisting of cellulose esters, cellulose ethers, nitrocellulose, viscose cellulose, microcrystalline cellulose, and microfibrillated cellulose.

8. The photoimaging material of claim 6 wherein (b) is selected from the group consisting of 2,5-bis(5-t-butylbenzoxazol-2-yl)thiophene, 3-phenyl-7-(2,3-naphthotriazol-2-yl)coumarin and mixtures thereof.

9. The photoimaging material of claim 6 wherein from about 0.01 to 0.5 weight % of said optical brightener mixture is admixed with said polyethylene resin.

10. The photoimaging material of claim 6 wherein (b) is a pyrazoline based brightener having the formula:

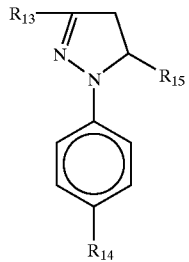

wherein $R_{13}$–$R_{15}$ are independently selected from the group consisting of hydrogen, an alkyl group having 1 to 15 carbon atoms, an alkoxyl group having 1 to 15 carbon atoms, an aryl group having from 6 to 15 carbon atoms, a sulfonamido group and mixtures thereof.

11. The photoimaging material of claim 10 wherein $R_{13}$–$R_{15}$ are independently selected from the group consisting of hydrogen, a methyl group, an ethyl group, a tert-butyl group, a tert-octyl group and mixtures thereof.

12. A photoimaging material comprising a photoimaging support, a titanium dioxide pigment that is substantially free of silane coupling agents adjacent to said photoimaging support, and an optically brightened polyethylene resin having from 0.001 to 1.0 weight % of optical brightener blend admixed with said polyethylene, wherein said optical brightener mixture comprises (a) from about 45 to 95 weight % of a mixture of benzoxazolyl stilbenes comprising (i) from about 25 to about 50 parts by weight of a first component selected from 4,4'-bis(benzoxazol-2-yl)stilbene and (ii) from about 75 to about 50 parts by weight of a second component selected from the group consisting of 4-(benzoxazol-2-yl)-4'-(5-methylbenzoxazol-2-yl)stilbene, and 4,4'-bis(5-methylbenzoxazol-2-yl)stilbene; and (b) from about 55 to about 5 weight % of at least one bis(benzoxazolyl)naphthalene based brightener, bis(benzoxazolyl)thiophene based brightener, a pyrazoline based brightener, a coumarin based brightener, and mixtures thereof wherein said weight percents of (a) and (b) are based on the total weight of optical brighteners in said mixture.

13. The photoimaging material of claim 12 wherein (b) is selected from the group consisting of 2,5-bis(5-t-butylbenzoxazol-2-yl)thiophene, 3-phenyl-7-(2,3-naphthotriazol-2-yl)coumarin, 3-phenyl-7-(1,2-naphthotriazol-2-yl)coumarin, 3-phenyl-7-(benzotriazol-2-yl)coumarin and mixtures thereof.

14. The photoimaging material of claim 12 wherein (b) is a pyrazoline based brightener having the formula:

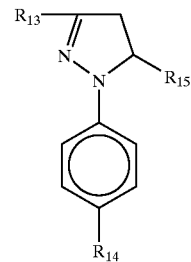

wherein $R_{13}$–$R_{15}$ are independently selected from the group consisting of hydrogen, an alkyl group having 1 to 15 carbon atoms, an alkoxyl group having 1 to 15 carbon atoms, an aryl group having from 6 to 15 carbon atoms, a sulfonamido group and mixtures thereof.

15. The photoimaging material of claim 14 wherein $R_{13}$–$R_{15}$ are independently selected from the group consisting of hydrogen, a methyl group, an ethyl group, a tert-butyl group, a tert-octyl group and mixtures thereof.

* * * * *